(12) United States Patent
Knapp

(10) Patent No.: US 9,881,698 B2
(45) Date of Patent: Jan. 30, 2018

(54) PLANAR GEOMETRY INERTIAL ELECTROSTATIC CONFINEMENT FUSION DEVICE

(71) Applicant: Daniel R Knapp, Charleston, SC (US)

(72) Inventor: Daniel R Knapp, Charleston, SC (US)

(*) Notice: Subject to any disclaimer, the term of this patent is extended or adjusted under 35 U.S.C. 154(b) by 651 days.

(21) Appl. No.: 14/477,334

(22) Filed: Sep. 4, 2014

(65) Prior Publication Data

US 2016/0071621 A1   Mar. 10, 2016

(51) Int. Cl.
*G21B 1/11* (2006.01)
*G21B 1/03* (2006.01)
*G21B 3/00* (2006.01)
*H05H 1/03* (2006.01)

(52) U.S. Cl.
CPC .............. *G21B 1/11* (2013.01); *G21B 1/03* (2013.01); *G21B 3/006* (2013.01); *H05H 1/03* (2013.01); *Y02E 30/14* (2013.01)

(58) Field of Classification Search
CPC . G21B 1/03; G21B 1/11; G21B 3/006; H05H 1/03; Y02E 30/14
USPC ........................................................ 376/144
See application file for complete search history.

(56) References Cited

U.S. PATENT DOCUMENTS

| | | |
|---|---|---|
| 3,258,402 A | 6/1966 | Farnsworth |
| 3,386,883 A | 6/1968 | Farnsworth |
| 3,530,036 A | 9/1970 | Hirsch |
| 3,530,497 A | 9/1970 | Meeks |
| 3,664,920 A | 5/1972 | Hirsch |
| 4,826,646 A | 5/1989 | Bussard |
| 5,160,695 A | 11/1992 | Bussard |
| 8,399,852 B2 | 3/2013 | Klein |
| 2012/0027150 A1* | 2/2012 | Wada ............... G21B 1/03 376/127 |

OTHER PUBLICATIONS

D. R. Knapp, Planar Geometry Inertial Electrostatic Confinement Fusion Device, Presented at the 15th Latin American Workshop on Plasma Physics/21st IAEA Technical Meeting on Research Using Small Fusion Devices, Jan. 27-31, 2014, San Jose, Costa Rica. Journal of Physics Conference Series, in press.

* cited by examiner

*Primary Examiner* — Jack W Keith
*Assistant Examiner* — Daniel Wasil

(57) ABSTRACT

The systems and methods described herein relate to the use of electrostatic elements to confine and circulate ions in trapped orbits so as to facilitate ion-ion and ion-neutral collisions resulting in nuclear fusion reactions. The systems employ a disc shaped cloud of ions wherein the turning region for the recirculating ions are located in a circular space around the periphery of the disc-shaped ion cloud, thereby maximizing the turning space region to increase the number of ions trapped in the device compared to discrete beam devices, which in turn enables higher fusion yield compared to prior art devices.

2 Claims, 4 Drawing Sheets

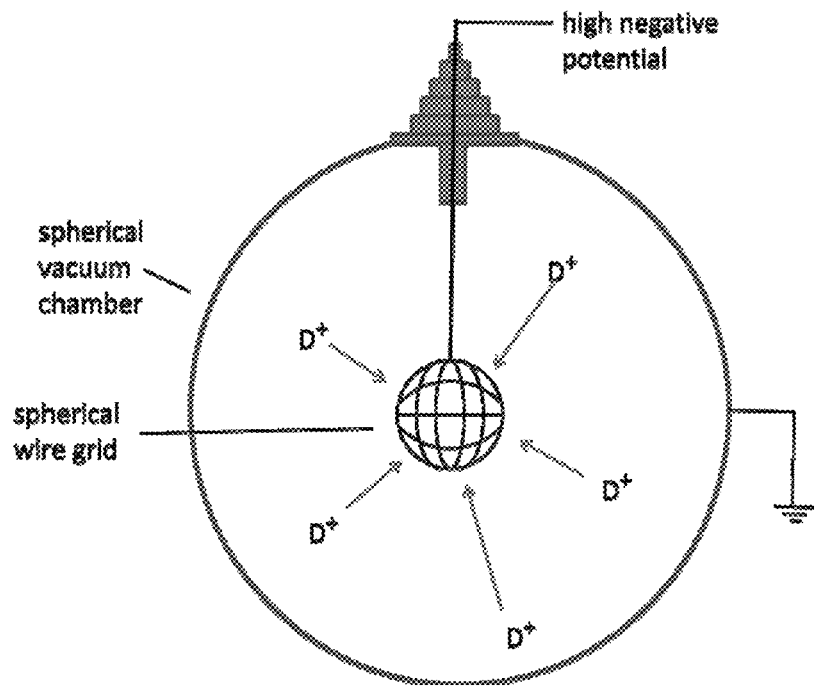
Figure 1.
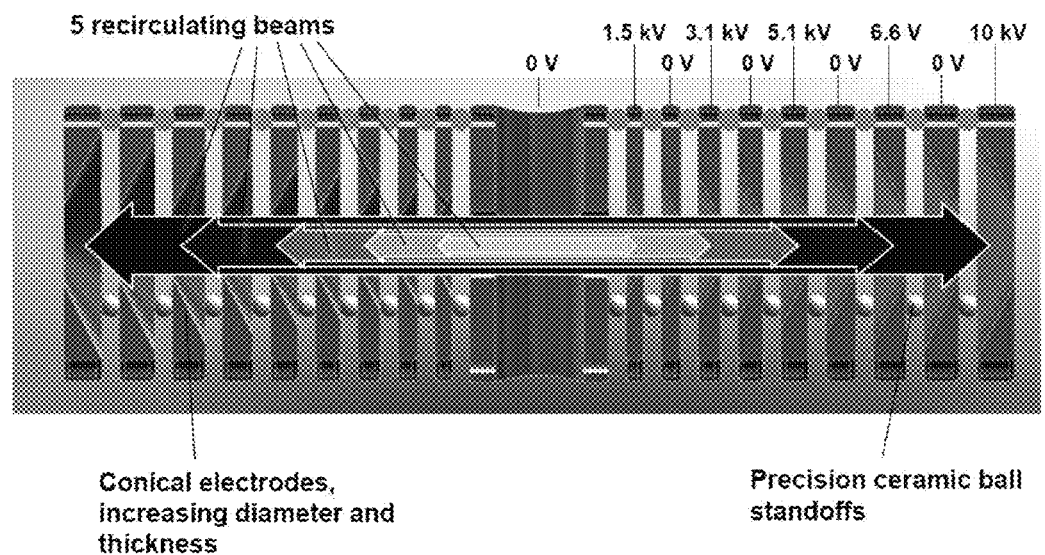
Figure 2 (The figure is taken from reference 20).

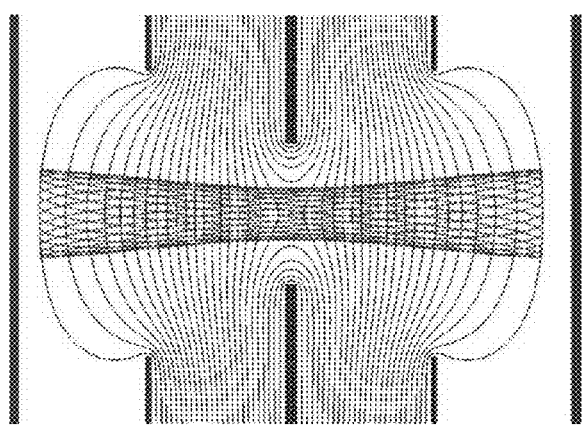
Figure 3 (The figure is taken from reference 23).
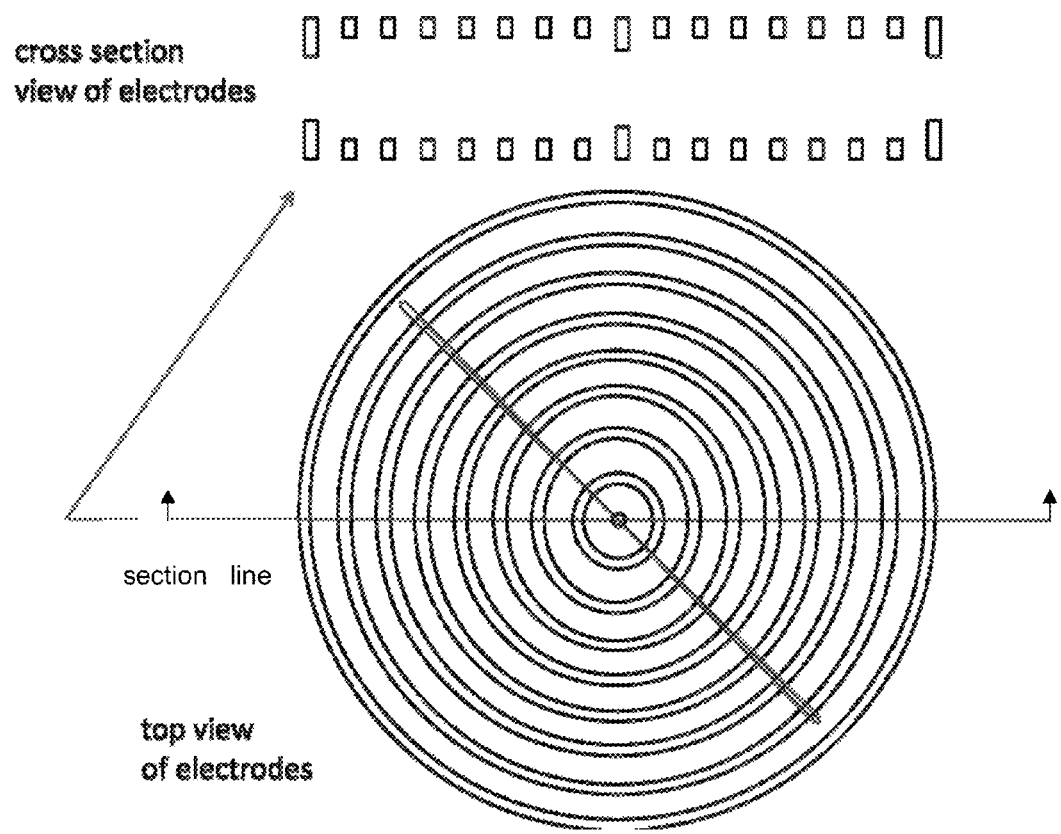
cross section
view of electrodes
section line
top view
of electrodes

V5 > V4 > V3 > V2 > V1

PLANAR GEOMETRY INERTIAL ELECTROSTATIC CONFINEMENT FUSION DEVICE

CROSS-REFERENCE TO RELATED APPLICATION

This application claims the benefit of provisional patent application Ser. No. 61/879,056, filed 2013 Sep. 17 by the present inventor.

BACKGROUND

Prior Art

The following is a tabulation of some prior art that presently appears relevant:

U.S. Patents

| Pat. No. | Kind Code | Issue Date | Patentee |
| --- | --- | --- | --- |
| 3,258,402 | B1 | 1966 Jun. 28 | Farnsworth |
| 3,530,036 | B1 | 1970 Sep. 22 | Hirsch |
| 3,386,883 | B1 | 1968 Jun. 4 | Farnsworth |
| 3,530,497 | B1 | 1970 Sep. 22 | Meeks et al. |
| 3,664,920 | B1 | 1972 May 22 | Hirsch |
| 4,826,646 | B1 | 1989 May 2 | Bussard |
| 5,160,695 | B1 | 1992 Nov. 3 | Bussard |
| 8,399,852 B2 | B2 | 2013 Mar. 19 | Klein et al. |

NONPATENT LITERATURE DOCUMENTS

G. H. Miley and S. Krupakar Murali, Inertial Electrostatic Confinement Fusion, Springer, New York, 2014. ISBN 978-1-4614-9337-2.

W. C. Elmore, J. L. Tuck, and K. M. Watson, On the inertial-electrostatic confinement of a plasma, Physics of Fluids 2, 239-246, 1959.

A. Lavrent'ev, et al., Jenergiya i plotnost'ionov v jelektromagnitnoj lovushke. Ukrain-skii Fizicheskii Zhurnal 8, 440-445, 1963.

R. Hirsch, Inertial-Electrostatic Confinement of Ionized Fusion Gases, Journal of Applied Physics 38, 4522-4535, 1967.

G. H. Miley, Y. Gu, J. M. DeMora, R. A. Stubbers, T. A. Hochberg, J. H. Nadler, R. A. Anderl, Discharge characteristics of the spherical inertial electrostatic confinement (IEC) device, IEEE Transactions on Plasma Science 25 (4) 733-739, 1997.

R. A. Nebel and D. C. Barnes, The periodically oscillating plasma sphere, Fusion Technology 34: 28-45, 1998.

J. Park, R. A. Nebel, S. Stange, S. Krupaker Murali, Experimental observations of a periodically oscillating plasma sphere in a gridded inertial electrostatic confinement device, Physical Review Letters 95:015003, 2005.

L. Ding, R. Badheka, Z. Ding, and H. Nakanishi, A simulation study of the planar electrostatic ion trap mass analyzer, Journal of the American Society for Mass Spectrometry 24, 356-364, 2013.

D. R. Knapp, Planar Geometry Inertial Electrostatic Confinement Fusion Device, Presented at the $15_{th}$ Latin American Workshop on Plasma Physics/$21_{st}$ IAEA Technical Meeting on Research Using Small Fusion Devices, Jan. 27-31, 2014, San Jose, Costa Rica. Journal of Physics Conference Series, in press.

FIELD OF THE INVENTION

The present invention relates to electrostatic systems and methods for charged particle generation, trapping, and colliding with other charged particles or neutral species in order to produce nuclear fusion reactions.

BACKGROUND OF THE INVENTION

Nuclear fusion is the process whereby two or more atomic nuclei combine to form a new atomic nucleus. For nuclei smaller than iron, such fusion is accompanied by a release of nuclear binding energy in the form of kinetic energy of the new nucleus and any released nuclear fragments (neutrons, protons, alpha particles, etc.). To achieve nuclear fusion, one must bring atomic nuclei together with sufficient energy to overcome the coulombic repulsion of the nuclei. The most familiar means of achieving nuclear fusion are by driving nuclei together with explosive forces (as in thermonuclear weapons), with lasers (as in inertial confinement fusion), or by thermally increasing the kinetic energy of the reactant nuclei (as in magnetic confinement devices like the tokamak).[1]

Nuclear fusion was first achieved by Cockcroft and Walton in 1932 using an electrostatically accelerated proton beam driven into a lithium target.[2] Beam-target devices continue to be employed for experimental as well as practical uses (e.g. deuterium-tritium fusion-based beam-target neutron sources used in oil well logging), but this method is not normally viewed as a useful approach to nuclear fusion.

When one compares the thermal velocities required for thermonuclear fusion (hundreds of millions of degrees) with the energies of electrostatically accelerated particles (several tens of kilo-electron volts being equivalent energies) it would seem that the latter would be the easier route to nuclear fusion. The problem with the beam-target approach lies in the very limited target lifetime. To overcome this limitation, there have been a series of approaches employing a target in the form of a plasma bombarded with electrostatically accelerated particle beams.[3]

The concept of confining electrons to achieve a virtual cathode in space and thereby confine a plasma target for inertial electrostatic confinement (IEC) fusion was first reported by Elmore, Tuck, and Watson in 1959.[4] This approach was also conceived by Lavrent'ev in the former USSR and published in 1963.[5] Philo Farnsworth, the inventor of television, was issued a U.S. patent in 1966 for an IEC fusion device that derived from his previous work on multipactor vacuum tubes.[6] Farnsworth and Hirsch further developed this approach using a negatively charged grid in place of the virtual cathode and reported achievement of deuterium-tritium nuclear fusion rates on the order of $10^{10}$ per second in a relatively small device (tens of cm. diameter) .[7] The basic geometry of the Farnsworth-Hirsch fusor is shown in FIG. 1. The general concept of operation is as follows. A spherical vacuum chamber (usually at ground potential) serves as an anode, and a spherical grid in the center serves as a cathode. The chamber is evacuated and then refilled with a low pressure of reactant gas (usually deuterium or a deuterium-tritium mixture). A high negative potential (several tens of kilovolts) placed on the central grid in the low pressure gas ignites a plasma, and the resulting positive hydrogen isotope ions are attracted toward the center of the device. A small percentage of the converging high energy ions collide and fuse in the center. Non-colliding ions continue through the center of the device and are ultimately reflected back toward the center by the anode chamber walls. The ions recirculate multiple times until they are lost by fusion, by collision with the grid, or by charge exchange collision with background gas. This simple concept of operation has subsequently been found to be much more complex, with a large fraction of the fusion occurring outside the center of the device likely, from ion-neutral collisions.[8] Nonetheless, this type of device, called a gridded fusor, can produce nuclear fusion; and it continues to be investigated and developed for a variety of uses.

Although this approach was shown to be capable of achieving nuclear fusion, the prospect of using the approach for energy production was dampened by two reports that argued on theoretical grounds that net energy production could never be achieved by IEC.[9,10] These 1995 papers continue to be cited as reason to not further pursue the IEC approach for energy production, but a few efforts in this regard continue (see below). Regardless of whether the IEC approach could ever be used for energy production, use of nuclear fusion without net energy gain has a series of useful applications. The greatest utility of IEC fusion is for neutron generation, and commercial IEC neutron generators are available.[11] There is need in multiple applications for compact, portable neutron generators which, unlike radioisotope neutron sources (e.g. $^{252}$Cf, $^{241}$Am—Be),) can switched on and off, and do not have the problems associated with radioisotope shielding and security. Applications include neutron activation analysis, landmine and other explosives detection, and nuclear materials detection. The applications in homeland security have driven extensive efforts in IEC in the national laboratories and in academic laboratories. Using advanced fuels, IEC devices also have the potential for use in medical isotope production as an alternative to cyclotrons. Finally, there is interest in the astronautics in IEC devices for spacecraft power and thrust generation.

A key limitation of the classic IEC fusor is the grid. Ion bombardment of the grid leads to heating, thermionic electron emission, and major energy loss. The ion bombardment heating ultimately leads to melting of the grid, which would be a major limiting factor to any possible use for energy production. Much effort has therefore been devoted to development of alternative gridless IEC devices. The best known of such devices is the Polywell® device.[12,13] This fusion reactor uses magnetic confinement to trap a central cloud of electrons to form a virtual cathode, which then serves to attract positive ions into a central core fusion region. The device has been under development for several years by a private company (Energy Matter Conversion Corporation) under U.S. Navy support. With recent termination of this support, the embargo upon publication of results was lifted, and a first publication has appeared.[14] In addition to the possibility of a power reactor of a size amenable to use on a ship or submarine, the possibility that the device could be capable of using aneutronic fuels (e.g. proton-boron-11 yielding only alpha particles) with direct energy conversion (alpha particles yielding electricity plus helium) is particularly intriguing. Very recently, there was a brief report that the Lockheed-Martin Skunkworks has achieved promising results with what may be a similar fusion device.[15] In addition to private sector efforts, at least one university laboratory (Department of Physics, University of Sydney) is pursuing work on the Polywell.[16]

Another variation of the spherical IEC fusion device is the "periodically oscillating plasma sphere" (POPS) device in which a radio frequency voltage is used to synchronize the oscillations of the ions in the device as a means of increasing the compression and resultant fusion of ions in the center of the device.[17,18] The POPS effect has been experimentally demonstrated in a gridded IEC fusion device.[19] A gridded POPS device suffers the same drawbacks due to ion bombardment of the grid as in the standard spherical IEC device. Thus, the use of a gridless geometry device is also advantageous for a POPS reactor.

A meeting report[20] and issued U.S. patent[21] described a linear beam-beam collision device for IEC fusion called the "Multiple Ambipolar Beam Line Experiment" ("MARBLE") (see FIG. 2). In this device, ions are recirculated as a linear beam in an electrostatic analog of an optical resonator. This ion beam trap was inspired by the linear electrostatic ion trap developed by Zajfmann et al.[22] and the more recently reported "anharmonic electrostatic ion trap" developed by Ermakov and Hinch.[23] (see FIG. 3.) The number of ions that can be stored in an electrostatic trap is limited by the space charge which develops at the points of lowest ion velocity, i.e. the turning points of the recirculating ion beam (the tips of the arrows in FIG. 2, and the two ends of the ion trajectory lines in FIGS. 3-7). In an IEC device, the limit of the number of trapped recirculating ions limits the rate of fusion. Klein, et al.[20,21] developed a device containing multiple overlapping linear ion traps in the same physical space, thus enabling the trapping of more ions to enable a higher fusion rate. In addition, the design of the device enabled trapping without a grid, a major problematic aspect of the spherical electrostatic fusor which limits the achievable fusion rate. There is no published data on the actual fusion rate in the MARBLE device; the company developing the device exhausted its funding before the work on this device was completed.[24]

The MARBLE device, in spite of the ability to trap multiple overlapping beams, is still a linear beam device with a single beam trajectory. The spherical fusor (FIG. 1), in theory, can trap recirculating ion beams throughout the full solid angle space of the sphere (the full $4\pi$ steradians). Thus, in theory, it should be able to accommodate a larger number of trapped ions than any linear ion trap. However, yet another drawback of the grid is that the finite number of openings in the grid result in the plasma and ions self organizing into beams or channels emanating from the grid openings, the so-called "star mode" that appears to be essential for maximum fusion rate.[25] This self-organization into discrete beams cannot be overcome by making the grid more dense with a larger number of openings, because practical limitations on wire size results in reduced transparency of the grid, and grid transparency is directly related to fusion rate. Thus what appears to be a full spherical geometry device is actually a device with a relatively small number of discrete beams (not significantly better than the MARBLE device in terms of number of beams), and it suffers from the other drawbacks of a gridded device. The planar disc geometry IEC fusion device, the subject of this invention, is an improvement over prior art devices in that it is gridless, and that it employs a full ($2\pi$ radians) planar circular angle space of beam trajectories to increase the ion turning space and thereby increase the number of trapped ions and resulting fusion rate.

An ion trap mass spectrometer of planar geometry was recently proposed in a report on modeling studies of a "planar electrostatic ion trap," but these studies were directed toward development of a new geometry for ion trap mass spectrometry operating at ion energies far below those needed for fusion; and no suggestion was made of the use of the trap for nuclear fusion.[26] Indeed, in the proposed ion trap mass spectrometer, particle collisions would impair the operation of the device and a planar ion trap mass spectrometer would need to be optimized to minimize collisions. In the disc geometry IEC fusion device, particle collisions are key to the operation of the device. The modeled planar ion trap mass spectrometer also employed a circular ion entrance channel and electrode gating to inject an externally generated sample ion beam into the trap after circulating the ions around the channel parallel to a peripheral gated entrance electrode. This design and mode of operation would not be optimal for a fusion device as it would severely limit the duty cycle. Finally, the potential profiles used for the planar ion trap mass spectrometer differ significantly from the potential profiles used in the fusion reactor of this invention. Thus the use of the planar disc ion cloud geometry for trapping and recirculating ions to promote collisions for fusion described in this invention constitutes a new approach to inertial electrostatic confinement fusion.

SUMMARY OF THE INVENTION

A new device for performing inertial electrostatic confinement (IEC) nuclear fusion is presented. The device provides a means for trapping and recirculating reactant ions as a disc shaped ion cloud wherein the turning region for the recirculating ions is distributed around a full circular space at the periphery of the disc. The new reactor is comprised of a two planar sets of concentric ring electrodes that contain the ion cloud between them. The two planar sets of concentric electrodes have opposing aligned central cylindrical electrodes separated by a free space for ion transmission. The two central electrodes are connected to a common potential that forms the potential well to attract the recirculating ions toward the center of the device. Since the device has a free open space for ion transmission in the center, it avoids ion collisions with the central electrodes as occurs in prior art devices containing a central grid electrode and the associated problems with such ion grid collisions. Since space charge at the turning region limits the number of ions that can be stored is such a trap, and the number of stored ions limits the achievable fusion rate, increasing the turning region space yields increased fusion rate compared to prior art reactor designs. The device can be used for conventional IEC fusion using constant potentials on the device electrodes as well as operation in oscillating cloud mode using additional radio frequency potentials.

DESCRIPTION OF THE DRAWINGS

FIG. 1 shows a cross section diagram of the inertial electrostatic confinement (IEC) fusion device commonly referred to as the Farnsworth-Hirsh fusor.

FIG. 2 shows a cross section diagram of the "Multiple Ambipolar Beam Line Experiment" (MARBLE) IEC fusion device from U.S. Pat. No. 8,399,852. The diagram is a vertical cross section through the center of the device whose axis of rotational symmetry is a horizontal line across the center of the diagram. (The figure is taken from reference 20).

FIG. 3 shows a cross section through the center line of a plate type anharmonic linear electrostatic ion trap showing equipotential surfaces at 20 volt intervals and ion trajectories (horizontal loops) with a trap potential of 1000 volts. The diagram is a vertical cross section through the center of the device whose axis of rotational symmetry is a horizontal line across the center of the diagram. For operation with positive ions, the central electrode is connected to a high negative potential (−1000 volts in this example), and the other electrodes are connected to ground potential. (The figure is taken from reference 23).

FIG. 4 shows drawings of two views of the planar disc inertial electrostatic confinement (IEC) fusion device of this invention. At the top is shown a vertical cross section of the electrodes taken through the center of the device. The axis of rotational symmetry is a vertical line through the center of the diagram. At the bottom is shown a top view of two layers of concentric ring electrodes formed by rotating the top cross section drawing about a vertical center line in the plane of the drawing. The horizontal line across the top view shows the section line that generates the cross section view at the top. The elongated "figure 8" line shows one recirculating ion trajectory between the two layers of rings (shown drawn above the top view for clarity although the actual ion trajectory is between the two layers of ring electrodes.

FIGS. 4, 5, 6, and 7 show the ring electrodes with simple rectangular cross sections for simplicity (FIG. 5 is shown with chamfered inside edges). The optimized device utilizes cross section profiles shaped to yield electric fields optimal for ion trapping. In one optimized embodiment of the invention, the electrodes have five-sided cross sections similar to the cross sections shown in figure.

DESCRIPTION OF THE INVENTION

Figure 5:
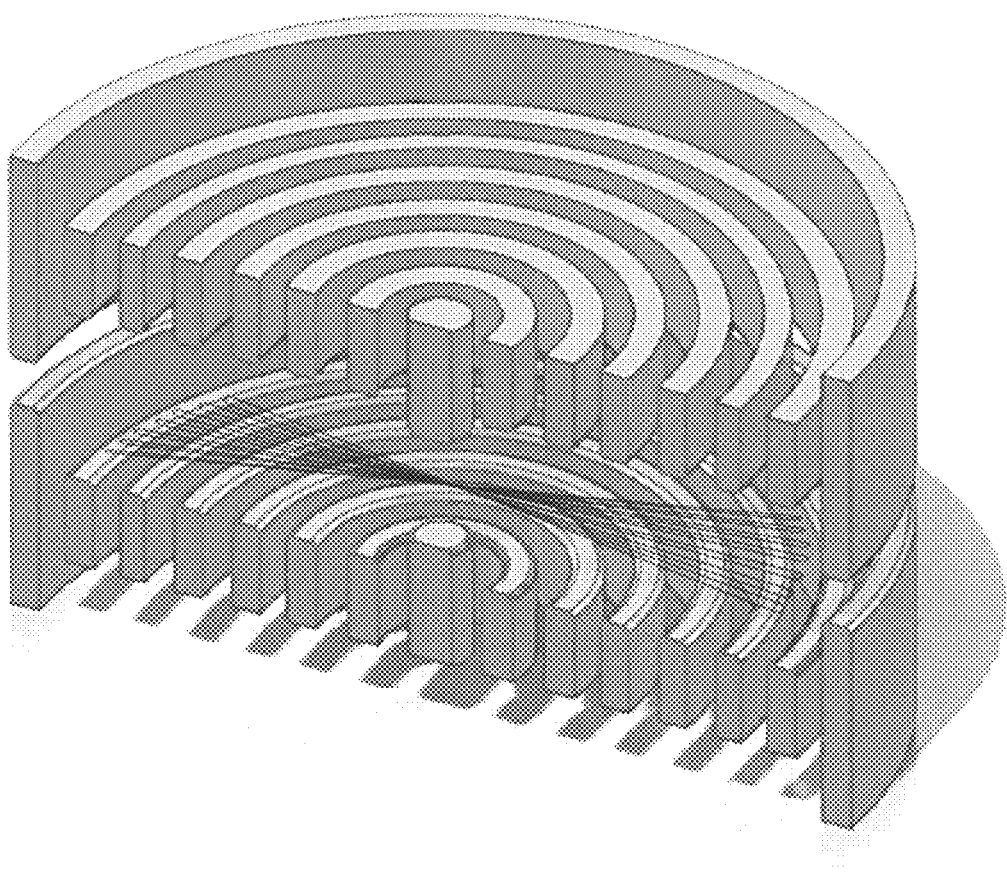
FIG. 5 shows a cutaway perspective view of an eight electrode planar disc inertial electrostatic confinement (IEC) fusion device with the elongated "figure 8" lines showing a few of the possible recirculating ion trajectories. The ion trajectories can extend around the full circle between the two sets of concentric ring electrodes.

FIG. 4 (top) shows a drawing of the cross section of a linear beam device similar to the MARBLE device in which a cylindrical array of electrodes can be formed by rotating the cross section about the horizontal centerline. If, rather than as in the MARBLE device, this cross section is rotated about a vertical line in the plane of the drawing through the center electrodes, the result is two layers of concentric ring electrodes, shown as a top view at the bottom of FIG. 4 and as a sectioned perspective in FIG. 5. This electrode configuration supports multiple recirculating ion trajectories through a full $2\pi$ circular angle as a disc-shaped cloud of ion beams between the two layers of ring electrodes. The central electrodes in this disc configuration consist of round cylinder electrodes at the top and bottom leaving a clear open trajectory in the center for the recirculating beams. Thus this design is a gridless device that has no solid electrodes traversing the ion path and subject to direct ion bombardment. Alternatively, the center electrodes can also be formed by two larger diameter cylinders than shown in the drawing, either solid or with a hollow annulus, to increase the size of the central interaction region. The elongated "figure 8" line in FIG. 4 shows one recirculating ion trajectory (which is actually between the two layers of concentric ring electrodes but is drawn above the view for clarity), and the similar lines in FIG. 5 show a series of such trajectories. The planar geometry IEC device supports a full circle of such trajectories forming a disc-shaped cloud of recirculating beams between the two layers of ring electrodes. The turnaround region of the paths shown in the diagrams is exaggerated to show how the ions turn around. The actual recirculating ion paths could even be straight lines where the ions slow to a complete stop before they are reflected along the same trajectory. The space charge limiting turning region is distributed around the periphery of the ion beam cloud, thus maximizing the size of the beam turning region to maximize the ion capacity of the trap and therefore the fusion rate capability of the device.

The ion trap device in this invention is operated within a grounded vacuum vessel which, after evacuation to high vacuum, is typically backfilled with a low pressure of gas. The ions to be trapped in the device are formed either by electrical breakdown of the low pressure gas within the device due to the potentials applied to the electrodes, by electron impact ionization of the background gas (either within or outside the device), or by use of one or more ion sources fed by an external gas supply. Any of the many methods of ion generation known to those skilled in the art can be used as the ion source for the device. For carrying out inertial electrostatic confinement fusion, the vacuum vessel is typically backfilled with a low pressure of deuterium gas or other fuel gas (e.g. a mixture of deuterium and tritium, a mixture of deuterium and helium-3, or other low atomic weight materials) typically to a pressure on the order of 1 Pa., but various pressures can be used to obtain Paschen discharge conditions depending upon the interelectrode distances. Alternatively, ions can be formed by electron impact ionization of background gas either in a field free region outside the trap (where the ions enter the trap by diffusion) or within the trap using an electron beam injected into the trap. These modes of ionization allow operation at lower pressures. The electrons for electron impact ionization can be generated using a hot filament or other electron emitter. As yet another alternative, ions can be generated in any of many types of ion sources known to those skilled in the art and injected into the vacuum chamber where they diffuse into the trap. Externally generated ions cannot be accelerated into the trap electrostatically, because their energy when entering the trap would be too high to allow trapping within the trap potential well. It is possible to inject externally generated ions into an electrostatic trap and maintain trapping of the ions by "gating," i.e. pulsing a lower potential to the barrier electrode(s), but this adds complexity and lowers the duty cycle of the trap.

Figure 6:
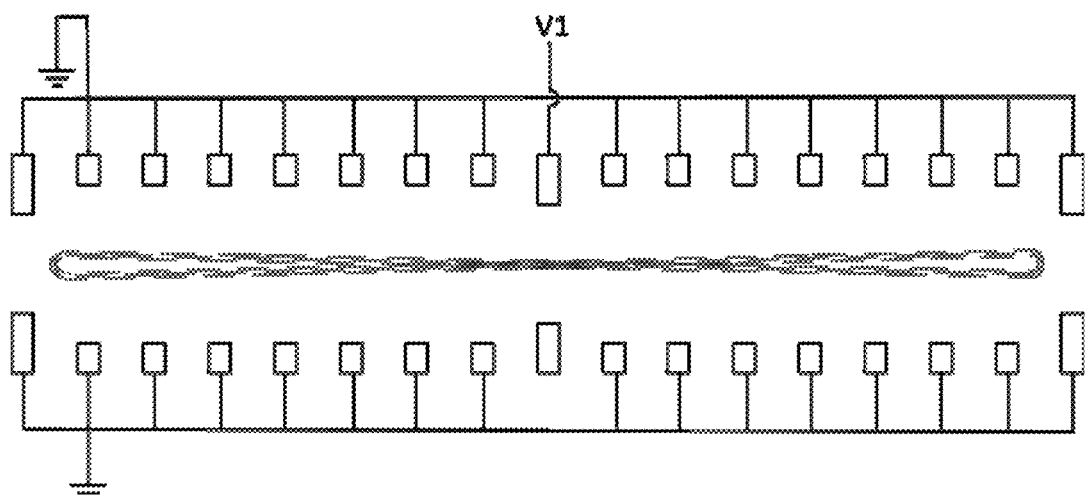
FIG. 6 shows a vertical cross section of the electrode connections for operating the device of this invention in a simple anharmonic oscillator trap mode. The looped lines show recirculating ion trajectories for a vertical section through center of the disc-shaped cloud of ion beam trajectories. Potential V1 is connected to both the top (connection shown) and to the bottom (connection not shown) center electrodes. For trapping positive ions, V1 is a high negative potential when the other electrodes are connected to the electrical ground. For nuclear fusion with positive ions, V1 is on the order of a few to several tens of kilovolts negative potential with respect to ground.

FIG. 6 shows a cross section of the ion trap device configured as a simple anharmonic electrostatic trap where all of the ring electrodes are electrically connected. This configuration can also be formed by replacing each layer of concentric rings by a single annular disc electrode at the top and bottom each with a hole for the center electrode. In this configuration, the resulting equipotential surfaces are similar to what would be obtained by rotating the device in FIG. 3 about a vertical line through the center electrode. This configuration has the advantage of simplicity and the need for only a single potential on the center electrodes with the other electrodes grounded, but it lacks the advantage of alternating gradient focusing (see below) to offset scattering losses.

Figure 7:
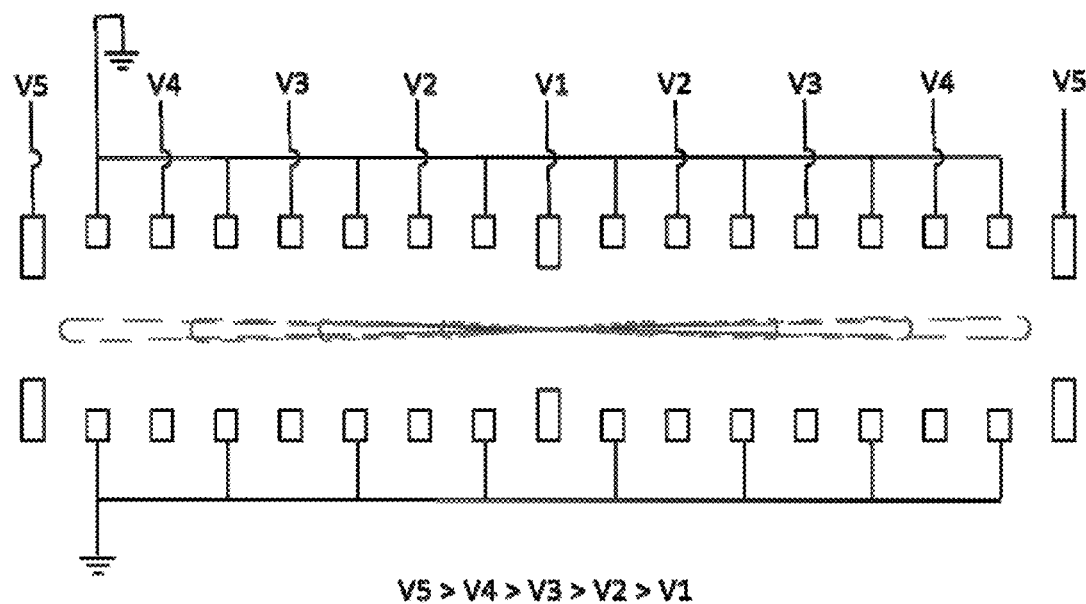
FIG. 7 shows a vertical cross section of the electrode connections for operating the device with multiple overlapping discs of ion beam trajectories, i.e. multiple concentric overlapping planar disc ion traps. The elongated "figure 8" lines show four sets of overlapping ion beams. For trapping positive ions, the potentials on the non-grounded electrodes have magnitudes of the order $V5>V4>V3>V2>V1$.

FIG. 7 shows a cross section of the device configured to give multiple overlapping disc traps. The number of electrodes can be chosen to give the desired number of overlapping traps. As in the MARBLE device,[20,21] the alternating potentials on the electrodes provide an alternating array of focusing and defocusing electrostatic lenses (einzel lenses in the case of the MARBLE device; vertical planar lenses in the disc device) that results in alternating gradient focusing ("strong focusing") as is commonly used in linear accelerators to maintain a small beam diameter.[27] This "strong focusing" effect can compensate for ion scattering, which is a major loss mechanism in IEC devices. In the disc device, the strong focusing only corrects the vertical (i.e. parallel to the ring axis) component of the scattering. However, the circular symmetry equipotential surfaces provides correction for the horizontal scattering component.

In summary, the described planar disc configuration IEC device will permit gridless operation to avoid the losses and other problems presented by the grid in gridded devices, and it enables use of a much larger beam space than either the spherical device or the MARBLE device. As such, it constitutes a new geometry which is significant improvement over existing IEC fusion devices to yield higher fusion yields than other devices of comparable size. In addition to the standard operation of the IEC reactor with DC potential, the new geometry offers similar improvements for operation in the POPS mode.

It is to be noted that the electrodes are illustrated in FIGS. 4-7 with simple rectangular cross sections for clarity. The electrical fields in the device are optimized by altering the cross section shape of the electrodes as guided by ion optical modeling studies to give better ion focusing than the simple rectangular cross section electrodes. Ion trajectory simulation studies have shown that five-sided cross section profiles similar to the shapes depicted in FIG. 2 have improved focusing properties compared to rectangular cross sections,[28] thus the preferred embodiment of the invention has electrode cross sections in this shape. However, other electrode cross section shapes, including circular cross section shapes, can be used in the device.

REFERENCES

1. J. P. Freidberg, Plasma Physics and Fusion Energy, Cambridge University Press, 2008.
2. J. D. Cockcroft, E. T. S. Walton, Experiments with high velocity positive ions. II. The disintegration of elements by high velocity protons, Proceedings of the Royal Society London A. 137, 229-242, 1932.
3. G. H. Miley, The Inertial Electrostatic Confinement Approach to Fusion Power, Chapter 10 in Current Trends in International Fusion Research, Springer, N Y, 1997, pp 135-148,
4. W. C. Elmore, J. L. Tuck, and K. M. Watson, On the inertial-electrostatic confinement of a plasma, Physics of Fluids 2, 239-246, 1959.
5. A. Lavrent'ev, et al., Jenergiya i plotnost'ionov v jelektromagnitnoj lovushke. Ukrain-skii Fizicheskii Zhurnal 8, 440-445, 1963 (reference cited from secondary sources).

6. P. Farnsworth, "Electric discharge device for producing interactions between nuclei," U.S. Pat. No. 3,258,402, Jun. 28, 1966.
7. R. Hirsch, Inertial-electrostatic confinement of ionized fusion gases, Journal of Applied Physics 38, 4522-4535, 1967.
8. A. McEvoy, Determination of Fusion Spatial Profiles in the HOMER IEC Device using the Time of Flight Diagnostic, presented at the 14th US-Japan Workshop on Inertial Electrostatic Confinement Fusion, 14-16 Oct. 2012, College Park Md.
9. T. Rider, A general critique of inertial-electrostatic confinement fusion systems, Masters Degree Thesis, Massachusetts Institute of Technology, 1994; Physics of Plasmas 2, 1853-1872, 1995.
10. W. M. Nevins, Can inertial electrostatic confinement work beyond the ion-ion collisional time scale?, Physics of Plasmas 2, 3804-3819, 1995.
11. NSD-Gradel Fusion, Ellange, Luxembourg; http://www.nsd-fusion.com.
12. R. W. Bussard, Method and apparatus for creating and controlling nuclear fusion reactions, U.S. Pat. No. 5,160,695, issued Nov. 3, 1992.
13. N. A. Krall, R. W. Bussard, Forming and maintaining a potential well in a quasispherical magnetic trap, Physics of Plasmas 2 (1): 146-158, 1995.
14. J. Park, N. A. Krall, P. E. Siek, D. T. Offermann, M. Skillcorn, A. Sanchez, K. Davis, E. Alderson, and G. Lapenta, High Energy Electron Confinement in a Magnetic Cusp Configuration, arXiv; 1406.0133 [physics.plasm-ph], 1 Jun. 2014.
15. C. Chase, Lockheed-Martin Skunkworks, Solve for X presentation "Energy for everyone" www.solveforx.com/, http://www.youtube.com/watch?v=JAsRFVbcyUY.
16. M. Carr and J. Khachan, The dependence of the virtual cathode in a Polywell™ on the coil current and background gas pressure, Physics of Plasmas 17, 052510, 2010.
17. R. A. Nebel and D. C. Barnes, The periodically oscillating plasma sphere, Fusion Technology 34: 28-45, 1998.
18. D. C. Barnes and R. A. Nebel, Stable, thermal equilibrium, large amplitude, spherical plasma oscillations in electrostatic confinement devices, Physics of Plasmas 5(7): 2498, 1998.
19. J. Park, R. A. Nebel, S. Stange, S. Krupaker Murali, Experimental observations of a periodically oscillating plasma sphere in a gridded inertial electrostatic confinement device, Physical Review Letters 95:015003, 2005.
20. A. Klein, The Multiple Ambipolar Beam Line Experiment (MARBLE), presented at the 13$^{th}$ U.S.—Japan Workshop on Inertial Electrostatic Confinement Fusion, Sydney, 2011; http://www.physics.usyd.edu.au/~khachan/IEC2011/Presentations/KleinMARBLEtalk-.pdf
21. A. Klein, M. Wittman, S. Rackey, Systems and methods for control of multiple charged particle beams, U.S. Pat. No. 8,399,852 B2; Mar. 19, 2013.
22. L. H. Andersen, 0. Heber, D. Zajfman, Physics with electrostatic rings and traps, Journal of Physics B 37, R57-R88, 2004.
23. A. V. Ermakov and B. J. Hinch, An electrostatic autoresonant ion trap mass spectrometer, Review of Scientific Instruments 81, 013107, 2010.
24. See discussion at http://www.beamfusion.org/
25. G. H. Miley, Y. Gu, J. M. DeMora, R. A. Stubbers, T. A. Hochberg, J. H. Nadler, R. A. Anderl, Discharge characteristics of the spherical inertial electrostatic confinement (IEC) device, IEEE Transactions on Plasma Science 25 (4) 733-739, 1997.
26. L. Ding, R. Badheka, Z. Ding, and H. Nakanishi, A simulation study of the planar electrostatic ion trap mass analyzer, Journal of the American Society for Mass Spectrometry 24, 356-364, 2013.
27. Courant, E. D.; Livingston, M. S.; Snyder, H. S.; Blewett, J., Origin of the "Strong-Focusing" Principle, Physical Review 91, 202-203, 1953.
28. D. R. Knapp, Planar Geometry Inertial Electrostatic Confinement Fusion Device Presented at the 15th Latin American Workshop on Plasma Physics/21$_{st}$ IAEA Technical Meeting on Research Using Small Fusion Devices, Jan. 27-31, 2014, San Jose, Costa Rica. Journal of Physics Conference Series, in press

I claim:

1. A system for generating, trapping and recirculating ions in a confined disc shaped ion cloud which enables the ions to recirculate across a disc space in stable oscillations and collide with other ions or neutrals within the space to produce nuclear fusion reactions, comprising:
   a. two layers of concentric ring electrodes with opposing pairs of electrodes placed equidistant from the central plane of the system, and
      with individual electrical connections to said electrodes to enable application of constant or varying electrical potentials to opposing pairs of said electrodes, and
   b. two electrically connected opposing cylindrical axial electrodes spaced equidistant from the central plane which form a potential well to attract ions toward the center of the ion cloud.

2. The system of claim 1 where the outermost concentric ring electrodes of the two layers are axially extended and merge at the central plane to form a single electrode extending between the two layers.

* * * * *